Patented Aug. 19, 1952

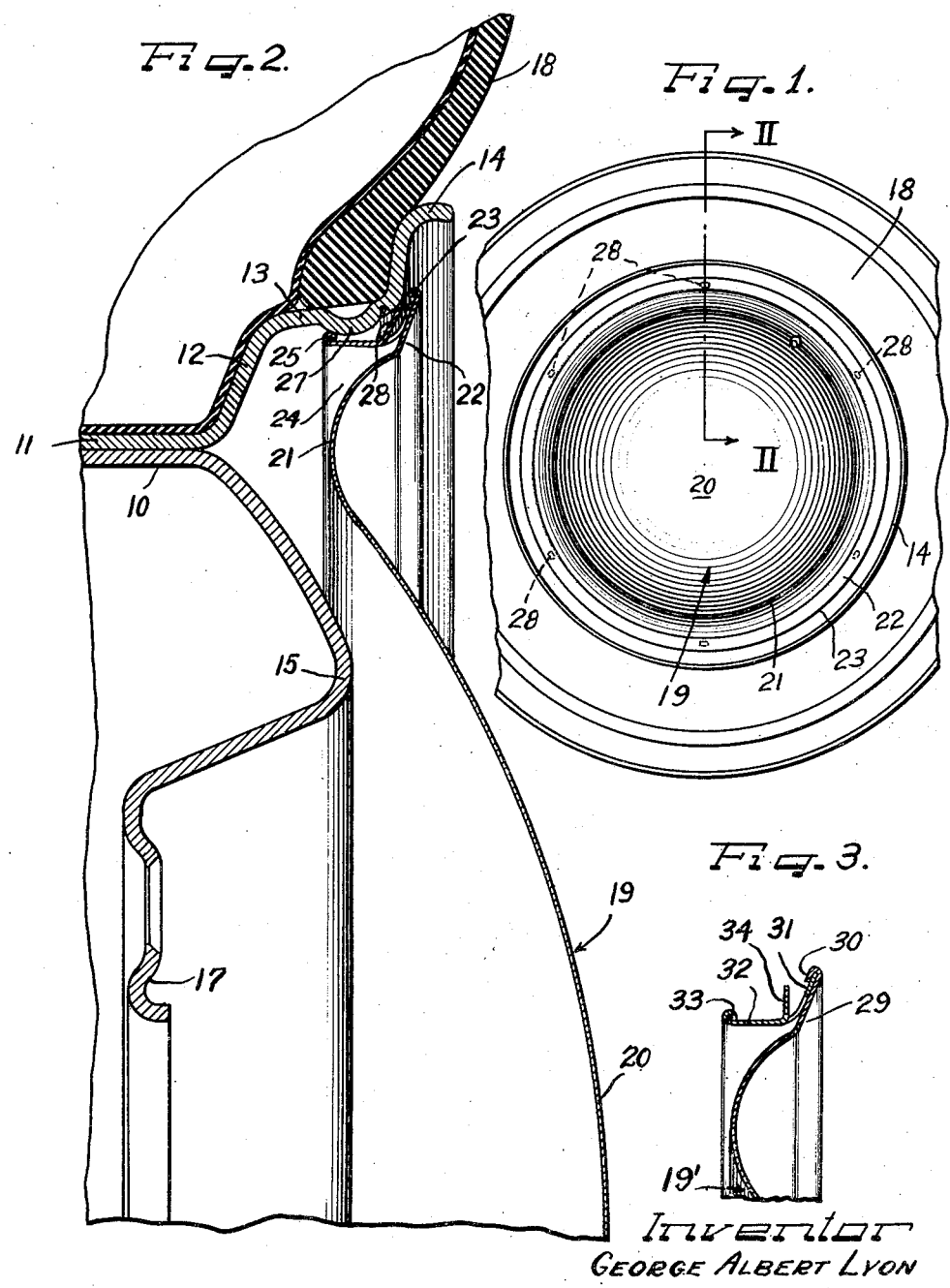

2,607,632

UNITED STATES PATENT OFFICE 2,607,632

WHEEL COVER

George Albert Lyon, Detroit, Mich.

Application May 8, 1948, Serial No. 25,835

13 Claims. (Cl. 301—37)

1

This invention relates to improvements in wheel structures, and more particularly concerns improved ornamental and protective cover structure for the outer side of a vehicle wheel.

An important object of the present invention is to provide in a wheel structure an improved cover for the outer side of the vehicle wheel and adapted to engage the wheel in a novel manner which will retain the cover effectively in place in a tensioned, rattle-proof manner.

Another object of the invention is to provide a wheel cover for a vehicle wheel of the type having a multi-flanged tire rim, wherein the cover is engageable in retained relation on the wheel by attachment to the tire rim in a manner which will hold the wheel snugly on the tire rim and free from rattling.

A further object of the invention resides in the provision of a novel vehicle wheel cover having improved means for retaining the cover on the wheel in a rattle-proof manner.

According to the general features of the present invention there is provided in a vehicle wheel structure, including a multi-flanged tire rim and a supporting body, the tire rim having wheel retaining radially inward protuberance, a cover for the outer side of the wheel including a circular member having generally axially inwardly extending flange structure at the outer margin thereof engageable with said cover retaining protuberance, said flange having generally radially outwardly extending intermediate projections engageable with the tire rim axially outwardly from said protuberance and arranged to hold the cover against rattling.

According to other general features of the invention there is provided in a cover for the outer side of a wheel having a multi-flanged tire rim, a circular cover member having a generally axially inwardly extending attachment flange structure including means at the axially inner margin thereof for retaining engagement with the tire rim, and means intermediately on said flange engageable with the tire rim axially outwardly from said retaining engagement means for holding the cover against rattling.

According to yet other features of the invention, the rattle-preventing means comprise a series of integrally struck out tongues on the flange of the cover member.

It is another feature of the invention to provide a cover adapted to be mounted on the outer side of a vehicle wheel, the cover comprising a circular cover member, a retaining flange extending axially rearwardly in concealed relation behind the cover member, said flange having radially projecting means thereon for retaining engagement with the wheel and other radially projecting means thereon engageable with the wheel

2 to hold the cover in non-rattling assembly with the wheel.

Other objects, features and advantages of the present invention will be readily apparent from the following detailed description of certain preferred embodiments thereof taken in conjunction with the accompanying drawings in which:

Figure 1 is a fragmentary elevational view of a vehicle wheel embodying the features of the invention;

Figure 2 is an enlarged radial sectional view through the wheel and cover structure taken substantially on the line II—II of Fig. 1 and Figure 3 is a fragmentary radial sectional view through a modified form of the cover.

As shown on the drawings:

A vehicle wheel with which the present invention is concerned may be of the type comprising a body member 10 and a multi-flanged tire rim 11, the latter being formed with a plurality of flanges including a radially outwardly extending side flange 12, a generally axially extending intermediate flange 13 and a terminal flange 14. Both the wheel body and the tire rim 11 may be formed from appropriate sheet metal stamped or rolled to shape. The wheel body may be of the one piece disk type including an annular axially outwardly bulging nose bulge 15 and a central bolt-on flange 17. A tire and tube assembly 18 is adapted to be supported in the tire rim 11.

In order to cover the outer side of the wheel assembly ornamentally, a cover 19 is provided. This preferably comprises a circular cover member formed from appropriate sheet material such as sheet metal and in the particular form shown is of a diameter to cover the wheel body 10 entirely and at least the major portion of the outer side of the tire rim 11. To this end the cover 19 is formed with a central outwardly convex annular portion 20 generally simulative of a hub cap and joined by an annular concave groove-like portion 21 with a generally radially and axially outwardly extending trim ring marginal portion 22. The axially inwardly indented groove-like annular portion 21 is generally simulative of and disposed to lie in assembly opposite to the juncture of the wheel body 10 with the tire rim 11 and which juncture as is customary affords a relatively deep annular groove between the intermediate flange 13 and the nose bulge 15.

The trim ring marginal portion 22 of the cover has a radial extent which brings the same opposite at least the base portion of the terminal flange of the tire rim. The extremity of the outer marginal portion 22 is turned back upon itself to provide a reinforcing and finishing bead 23 and a generally radially inwardly and then axially inwardly extending attachment flange 24, the latter having a generally L-shape cross sectional formation which clears the intermediate flange 13 of the tire rim and the shoulder where the intermediate flange of the tire rim joins the terminal flange 14.

The axially inwardly extending flange 24 is provided with means for attaching the same to the wheel, herein comprising a radially outwardly projecting turned terminal bead 25. This bead is engageable with radially inwardly projecting cover retaining bumps 27 formed by pressing the intermediate flange 13 of the tire rim inwardly at appropriate annularly spaced points. Through this arrangement, the cover 19 can be assembled with the wheel merely by placing the same in general concentricity with the wheel and then pressing the same inwardly until the retaining bead 25 of the flange 24 engages behind the retaining bumps 27 by a snap-on action. Removal of the wheel involves the reverse process, namely the application of appropriate axially outward force to the cover as by applying a pry-off tool such as a screw driver or the like between the finishing bead 23 and the terminal flange 14 and applying the necessary pry-off force until the flange 24 and more particularly the retaining bead 25 thereof snaps past the retaining bumps 27 on the intermediate flange 13 of the tire rim to release the cover.

Inasmuch as there are various manufacturing tolerances required in order to expedite manufacture and which may vary to some extent so that when the cover 19 is applied to the wheel, there may be a certain amount of looseness existing between the beads 23 and 25 and the opposing portions of the tire rim. This obviously would result in disagreeable rattling in the operation of the vehicle with which associated.

In order to overcome any possibility of the cover rattling on the wheel due to any looseness in the assembly, means are provided on the retaining flange 24 of the cover to compensate for and avoid any such looseness. Herein such means comprises a series of generally radially outward projecting elements 28 in the present instance comprising a series of tabs, fingers, or tongues integrally struck out from the flange 24 and bent out of the general plane thereof to extend normally generally radially outwardly in spaced relation to the radially extending portion of the flange 24 and having the extremities thereof so disposed that when the cover is applied to the wheel the tab extremities will engage the shoulder between the flanges 13 and 14 of the tire rim. By having the tabs 28 extending in a manner such that the spacing between the tips thereof and the bump-engaging surface of the terminal bead 25 of the cover retaining flange is less than the space between the retaining portions of the bumps 27 and the intervening shoulder between the flanges 13 and 14, the result in assembly is that the tabs 28 are necessarily stressed out of their normal plane generally axially outwardly as the flange 24 moves axially inwardly into the snapped on condition thereof relative to the retaining bumps 27 of the tire rim. Thus, the resilient reaction of the tabs 28 causes the cover to be held on the wheel in a tensioned rattle-proof relation since the tab tension tends to draw the retaining bead 25 tightly against the axially inner sides of the retaining bumps 27 and draw the finishing bead 23 of the cover slightly away from the flange 14 of the tire rim. Moreover, since the tabs 28 are relatively resilient they serve as shock absorbers which will take up bumps against the cover 19 and will also absorb vibrations in the wheel which might tend to cause rattling.

In the modified form of the invention shown in Fig. 3, the cover retaining flange instead of being formed integrally in one piece with the body of the cover member is formed as a separate annular portion which is attached to the body of the cover. To this end, a cover member 19' is provided with a marginal portion 29 having at its outer edge a turned under clamping flange 30 which engages a generally radially and axially outwardly extending marginal portion 31 of an axially rearwardly extending retaining flange 32 having a cover retaining terminal bead 33. Struck out integrally from the flange 32 and more particularly the outturned portion 31 thereof is a series of generally radially extending anti-rattle, tensioning, shock absorbing tabs 34 which operate in the same manner as the similar tabs 28 of the cover 19 previously described.

It will be understood that when the cover 19' is applied to the wheel, the tabs 34 will be placed under stress similarly as the tabs 28, that is they will be flexed from the full line position shown in Fig. 3, which is radially outwardly to a more axially outward condition substantially as the tabs 28 are flexed from the dash position shown in Fig. 2 to the full line position shown in Fig. 2 when the cover 19 is in place on the wheel.

I claim as my invention:

1. In a vehicle wheel structure including a multi-flanged tire rim and a supporting body, the tire rim having a cover retaining radially inward protuberance, a cover for the outer side of the wheel including a circular member having generally axially inwardly extending flange structure at the outer margin thereof engageable with said cover retaining protuberance, said flange having generally radially outwardly extending intermediate projections engageable with the tire rim axially outwardly from said protuberance and arranged to hold the wheel against rattling.

2. In a vehicle wheel structure including a multi-flanged tire rim and a supporting body, the tire rim having a cover retaining radially inward protuberance, a cover for the outer side of the wheel including a circular member having generally axially inwardly extending flange structure at the outer margin thereof engageable with said cover retaining protuberance, said flange having generally radially outwardly extending intermediate projections engageable with the tire rim axially outwardly from said protuberance and arranged to hold the wheel against rattling, said projecting rattle-preventing means comprising resilient tabs extending from the cover flange.

3. In a wheel structure including a wheel body and a multi-flanged tire rim, the tire rim having an intermediate generally axially extending flange formed with radially inwardly extending cover retaining bumps, a wheel cover comprising a circular cover member including a retaining flange extending generally axially therebehind, a retaining bead on the axially inner terminal of the flange engageable in snap-on relation with said bumps, and resilient tabs extending generally radially outwardly from said flange in axially outwardly spaced relation to said bead and engaging the tire rim in tensioned flexed relation whereby to hold said bead snugly against said bumps.

4. In a cover for the outer side of a wheel having a multi-flanged tire rim, a circular cover member having a generally axially inwardly extending attachment flange structure including means at the axially inner margin thereof for retaining engagement with the tire rim, and an annular series of generally radially outwardly extending projections intermediately on said flange engageable with the tire rim axially outwardly from said retaining engagement means for holding the cover against rattling.

5. In a cover for the outer side of a wheel having a multi-flanged tire rim, an annular cover member having a generally axially inwardly extending attachment flange structure including means at the axially inner margin thereof for retaining engagement with the tire rim, and means intermediately on said flange engageable with the tire rim axially outwardly from said retaining engagement means for holding the wheel against rattling, the rattle-preventing means comprising a series for integrally struck out tongues on the flange of the cover member.

6. A cover adapted to be mounted on the outer side of a vehicle wheel, the cover comprising a circular cover member, a retaining flange extending generally axially rearwardly in concealed relation behind the cover member, said flange having radially projecting means thereon for retaining engagement with the wheel, and an annular series of radial projections on the flange in spaced relation to the retaining means and engageable with the wheel, said retaining means and said projections cooperating to hold the cover in non-rattling assembly with the wheel.

7. In a cover for the outer side of a vehicle wheel, a circular cover body, said body having on the outer margin thereof a generally axially rearwardly extending concealed attachment flange, said flange having wheel-engaging cover-retaining means and also intermediate generally radially extending integrally struck out anti-rattle tabs for engaging firmly against the wheel.

8. In a cover for the outer side of a vehicle wheel, a circular cover body, said body having on the outer margin thereof a generally axially rearwardly extending concealed attachment flange, said flange having intermediate generally radially extending integrally struck out anti-rattle tabs, said flange comprising an integral one piece underturned generally L-shape extension of the outer margin of said circular body.

9. In a cover for the outer side of a vehicle wheel, a circular cover member, said cover member having a generally axially rearwardly extending concealed attachment flange, said flange having intermediate generally radially extending integrally struck out anti-rattle tabs, said flange comprising a separately formed annulus and the cover member having an underturned margin clamping a margin of the flange annulus in assembly.

10. In a wheel cover of the character described, a circular cover member having an outer marginal portion adapted to be placed in concealing relation to a tire rim, and a retaining flange extending generally radially inwardly and axially inwardly on a generally L-shaped cross section behind said tire rim concealing portion, said flange having means thereon for engaging an intermediate flange of a multi-flanged tire rim, and an annular series of radially outwardly extending resiliently deflectable shock absorbing, cover tensioning anti-rattle flanges adapted to engage against the terminal flange of the tire rim and maintain said rim concealing portion in spaced relation to the tire rim.

11. In a wheel structure including a body part and a multi-flange tire rim having an intermediate generally axially extending flange and a terminal flange joining said intermediate flange, a circular cover for substantially concealing the outer side of the wheel and more particularly the tire rim and having an outer marginal portion for concealing said intermediate flange and a portion of the terminal flange, and means carried by said marginal portion of the cover in concealed relation therebehind and including a portion engageable with the intermediate flange of the tire rim for retaining the cover in place on the wheel and another portion spaced axially outwardly from and projecting radially outwardly relative to said first mentioned portion and also spaced both radially inwardly and axially inwardly from said marginal cover portion and engageable with the tire rim terminal flange adjacent juncture with the tire rim intermediate flange and acting to hold said marginal cover portion in spaced relation to the concealed portion of the tire rim terminal flange.

12. In a cover for disposition at the outer side of a vehicle wheel including a multi-flange tire rim having an intermediate and a terminal flange, a circular cover body having a radially outer marginal portion for concealing disposition relative to the tire rim intermediate flange and at least an adjacent portion of the terminal flange, said marginal portion carrying therebehind retaining and spacing means including a portion extending axially inwardly from said cover margin and at its axially inner limit projecting generally radially outwardly for cover retaining engagement with the tire rim intermediate flange, and a spacer portion spaced axially outwardly from said cover retaining portion but projecting radially outwardly therebeyond for engagement with the tire rim terminal flange adjacent to juncture of the latter with the intermediate flange, said spacer portion being disposed in radially inwardly and axially inwardly spaced relation to the radially outward limit of said cover margin and serving to maintain the cover margin in axially outwardly spaced relation to the tire rim terminal flange in the full assembly of the cover with the weel.

13. In a wheel structure including a load sustaining body part and a multi-flange tire rim having an intermediate flange and a terminal flange turned generally axially outwardly, a cover for concealing the outer side of a wheel and of a diameter to extend in adjacent spaced relation to the inner corner of the extremity of the terminal flange, and means carried by the inside of the cover including a portion engageable with the intermediate flange for retaining the cover on the wheel and a portion engageable against the inner part of the terminal flange to retain the cover in outwardly spaced relation to such inner part of the terminal flange, whereby to afford a complete ventilation and dirt ejection gap between the outer margin of the cover and the tire rim.

GEORGE ALBERT LYON.

REFERENCES CITED

The following references are of record in the file of this patent:

UNITED STATES PATENTS

| Number | Name | Date |
| --- | --- | --- |
| 2,306,631 | Lyon | Dec. 29, 1942 |
| 2,410,174 | Lyon | Oct. 29, 1946 |